United States Patent Office 2,986,585
Patented May 30, 1961

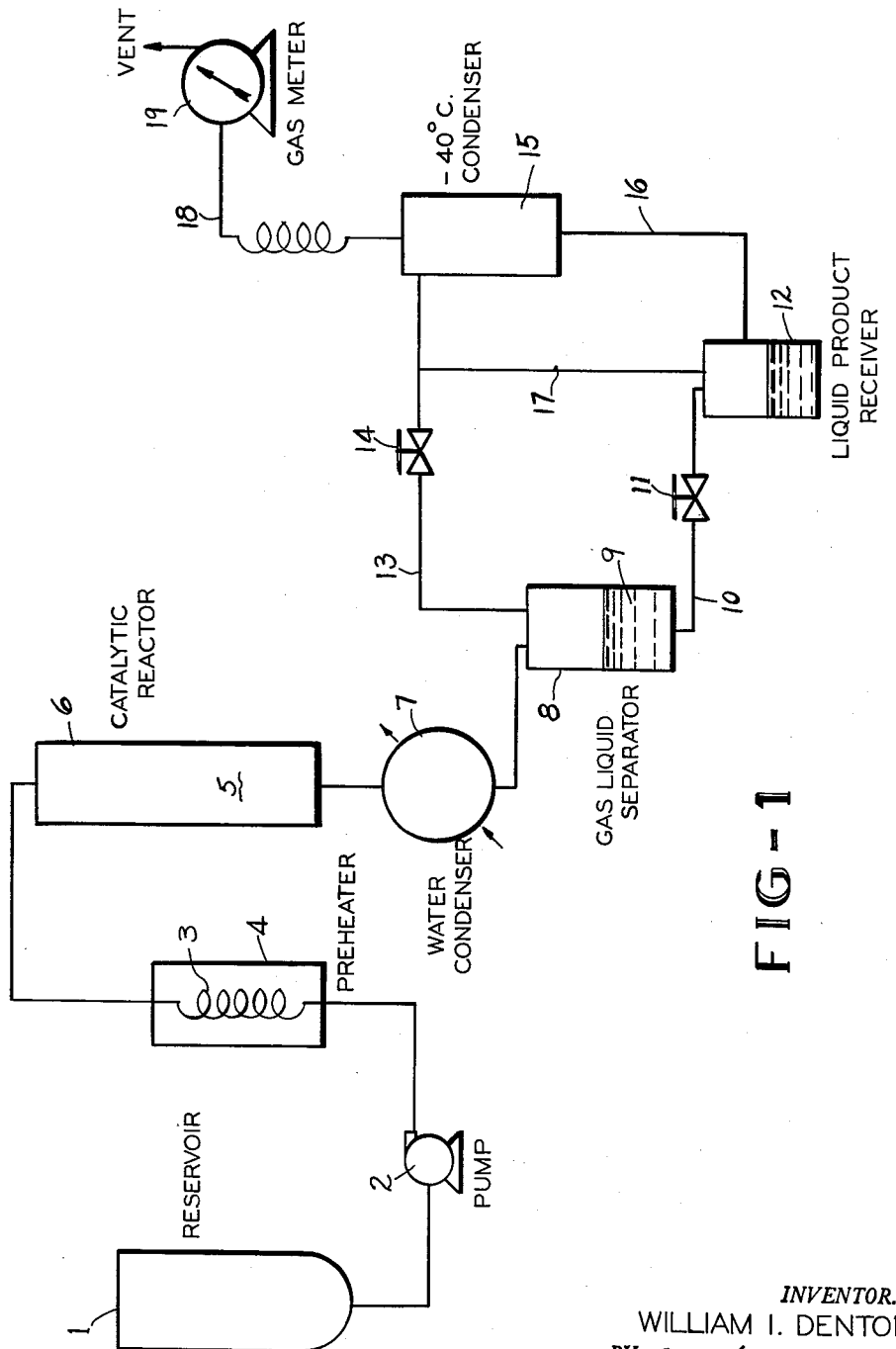

2,986,585
ISOMERIZATION OF AN ALKYLENE OXIDE TO THE CORRESPONDING ALCOHOL

William I. Denton, Cheshire, Conn., assignor to Olin Mathieson Chemical Corporation, a corporation of Virginia Filed Apr. 2, 1959, Ser. No. 803,792

5 Claims. (Cl. 260—632)

This invention relates to the catalytic conversion of gaseous propylene oxide to allyl alcohol, and particularly to an improved process therefor using a highly efficient catalyst.

In this type of process, the prior art procedures have been characterized by insufficient extents of conversion and inadequate production capacity to make them commercially attractive.

Thus the trilithium phosphate catalyst of U.S. 2,426,624 was disclosed as resulting in the conversion at each pass of only about 17 to 21% of the propylene oxide feed to allyl alcohol, at production rates of 60 to 179 grams of alcohol per liter of catalyst per hour.

The main object of this invention has been to provide a catalytic process for the conversion of propylene oxide to allyl alcohol using an efficient catalyst which is capable of a high extent of conversion at each cycle and characterized by large productive capacities and high ultimate yields of allyl alcohol from the propylene oxide feed.

The foregoing and other objectives have been accomplished in that extents of conversion in each cycle of 60 to about 75% with ultimate yields of 83 to 95%, and production rates of 250 to about 550 grams of allyl alcohol per liter of catalyst per hour have been attained.

Such excellent results have been made possible by the provision in accordance with this invention of proper lithium phosphate catalyst, more specifically, leached basic lithium phosphate, which has been prepared carefully in accordance with required conditions and procedure. As will be shown in greater detail hereinafter, various preparations of substantially pure trilithium phosphate have displayed little or no activity in catalyzing the desired isomerization of propylene oxide to allyl alcohol. In contrast, catalytic activity many times that of the best materials of the prior art has been substantiated for preparations wherein a basic lithium phosphate was precipitated and then all but a small fraction of its alkali metal hydroxide content was removed by leaching with water.

The initial basic lithium phosphate is precipitated in the presence of at least 0.2 mole, preferably 1 to 2 moles, of alkali metal hydroxide per mole of lithium phosphate ($Li_3PO_4$). The alkali metal hydroxide, for example, lithium hydroxide, sodium hydroxide, or potassium hydroxide, or a mixture thereof, may be present in the lithium salt solution, which is preferred, or in the phosphate solution or in both, its presence in solution being essential prior to the formation of the precipitated lithium phosphate.

The lithium solution is preferably one containing lithium hydroxide or lithium nitrate, although other soluble salts such as lithuim acetate, lithium formate or lithium borate are useful. The phosphate solution is preefrably of sodium or potassium orthophosphate or a mixture of the two, and best results have been obtained when such solution is added to the lithium solution.

The precipitate of basic lithium phosphate is then separated by filtration or centrifuging and must be subjected to multiple leachings with water or to remove all but a small fraction of its alkali hydroxide content. This is most readily accomplished by mixing the precipitate with many times its volume of water, filtering or centrifuging, and repeating this treatment at least two to four times. Unless this is done, the catalytic activity will be inadequate. For example, repeated washings of a filter cake of the precipitate with a large volume of water have resulted in a product of poor catalytic activity. For optimum activity, a minimum of three to five leachings are essential, resulting in an alkali hydroxide content in the lithium phosphate ranging from 0.05 to 1.0% by weight, expressed in terms of its alkali metal content.

It is noteworthy that the desired composition of the product is insufficient of itself to insure that it will display the required catalytic activity and selectivity, as consistently excellent results have been obtained only with the use of leached basic lithium phosphate products as described above.

Thus, naturally occurring lithium orthophosphate ($Li_3PO_4$), lithiophilite, was found to be catalytically inactive, as were also samples of lithium orthophosphate prepared by the neutralization of three moles of lithium hydroxide with one mole of phosphoric acid, or by the reaction of lithium nitrate and sodium orthophosphate either in an acid solution or in a solution made alkaline with ammonium hydroxide.

The evaluation of various catalysts was carried out in apparatus illustrated diagrammatically in Figure 1, which is likewise representative of the operation of the process on a commercial scale.

The liquid propylene oxide is charged into a measuring vessel 1 and is fed into the system at the desired rate by a suitable pump 2, which may for example consist of a positive displacement pump of the reciprocating type. The liquid passes through a preheater consisting of a stainless steel spiral tube 3, housed within an electrically heated furnace 4, where the liquid is vaporized and heated to about reaction temperature.

The preheated oxide vapor is then passed downwardly through a cylindrical column of catalyst 5, maintained at the desired reaction temperature by means of suitable heating units or heat exchange jacket, not shown, in a tubular stainless steel reactor 6. For example, the column may have a diameter of ⅞ inch and contain 120 cubic centimeters of catalyst. Preferably, the temperature is controlled independently at the preheater, reactor and reactor exit and temperature gradients in the reactor zone are minimized by enclosing the catalyst column in a cylindrical block of cast iron having walls two inches thick.

The products from the reactor are passed through a water-cooled condenser 7 and then into a gas-liquid separator 8. The liquid product 9 collected therein flows through discharge line 10 provided with valve 11 into receiver 12. Valve 11 is advantageously controlled automatically to maintain a desired level of liquid in separator 8. Vapor passes from the separator 8 through conduit 13, provided with valve 14, to condenser 15, maintained at −40° C. Liquid condensed therein flows through line 16 to receiver 12, the vapor space of which is connected by conduit 17 to line 13. The uncondensed gas passes from condenser 15 through line 18 to gas meter 19 and is then vented to the atmosphere. Runs made with the use of an active catalyst resulted in rather small amounts of non-condensed gas, for example 0.05 cubic foot during a 21 hour run at 275° C. at 0.5 space velocity.. The liquid product in receiver 12 was weighed and analyzed at the end of each run, separation generally being effected by fractional distillation.

In the evaluation of catalysts prepared by various methods for use in the isomerization of an alkylene oxide to the corresponding unsaturated alcohol, the activity of the catalyst is measured by the extent of conversion of oxide to alcohol per pass through the reactor. Thus, a fairly active catalyst results in over 40% conversion and a catalyst of excellent activity can result in the conversion of about 75% of the oxide to alcohol for each pass through the catalyst bed.

The selectivity of the catalyst is likewise of great importance in view of the possibility of other conversions, it being well known for example that alkylene oxides can be isomerized to aldehydes as well as other carbonyl compounds. The occurrence of such side reactions results in the consumption of the starting alkylene oxide to products other than the desired alcohol. With the use of a highly selective catalyst, such side reactions are suppressed, so that unconverted alkylene oxide can be recovered and again passed through the reactor, resulting in ultimate yields of alcohol as high as over 90% to 95% of the starting oxide. The ultimate yield, which is thus a measure of the selectivity of the catalyst can be determined by dividing the weight of alcohol obtained by the weight of oxide consumed (weight of recovered oxide subtracted from the weight passed through the reactor) or, generally more conveniently, by dividing the weight of the alcohol product by the total weight of all products other than recovered oxide. For commercial success, the catalyst should be sufficiently selective as to result in ultimate yields of the desired alcohol product amounting to over 80 to 95%, preferably over 85%.

The following tables summarize the yield data obtained with the apparatus and procedure described above, using catalysts prepared as indicated. Reaction temperature was 275° C. and the space velocity was 0.5 (volume of liquid propylene oxide feed per hour divided by the volume of the catalyst column). It is noteworthy that the attempted use of granular lithiophilite (naturally occurring $Li_3PO_4$) as catalyst resulted in the conversion of only 0.8% of propylene oxide to allyl alcohol. No material improvement resulted even after purification of the lithiophilite by treatment with acid.

Inadequate catalytic activity or selectivity or both were shown in the following preparations of lithium orthophosphate.

| Example | Solution 1 | Solution 2 | Order of Addition | Yield of Allyl Alcohol | |
|---|---|---|---|---|---|
| | | | | Per Pass | Ultimate |
| 1 | 3 $LiNO_3$ | 4.5 $Na_3PO_4$ / 0.75 NaOH | 1 to 2 | 62.0 | 84 |
| 2 | 4 LiOH | 3 $Na_3PO_4$ | 2 to 1 | 70.6 | 83 |
| 3 | 3 LiOH | 4.5 $Na_3PO_4$ | 1 to 2 | 71.5 | 84 |
| 4 | 3 LiOH | 4.5 $Na_3PO_4$ | 2 to 1 | 67.8 | 95 |
| 5 | 3 LiOH | 3 $Na_3PO_4$ / 1 NaOH | 2 to 1 | 66.8 | 85 |
| 6 | 3 LiOH | 4.5 $Na_3PO_4$ / 1.0 NaOH | 1 to 2 | 59.2 | 91 |
| 7 | 4.2 LiOH | 3 $H_3PO_4$ | 1 to 2 (boil 3 hours) | 68.6 | 83 |
| 8 | 4.2 LiOH | 3 $H_3PO_4$ | 1 to 2 (boil 3 hours) | 56.3 | 85 |
| 9 | 3 $LiNO_3$ | 4.5 $Na_3PO_4$ / 0.75 NaOH | 2 to 1 | 60 | 92 |
| 10 | 4 $LiNO_3$ | 3 $K_3PO_4$ / 1 KOH | 1 to 2 | 59.4 | 83 |
| 11 | 3.25 LiOH | 3 $H_3PO_4$ | 2 to 1 | 74.6 | 88 |

The above catalysts were prepared generally in accordance with the procedure and conditions of the following preferred process for the catalyst of Example 4.

The remarkable selectivity of the catalysts of this invention was further shown by the absence of detectable amounts of propionaldehyde in the product.

A solution of lithium hydroxide was prepared by dissolving 126 grams (3 moles) of the monohydrate in 500 cc. of distilled water. A solution of sodium orthophosphate was prepared by dissolving 570 grams (1.5 moles) of the dodecahydrate in 750 cc. of distilled water and the solution was warmed to 30° to 60° C., preferably about 40° C. The latter solution was added in one or two minutes to the first, during agitation, and resulted in the formation of a precipitate at a pH of 12 to 14. The precipitate was filtered and washed and was then dispersed in 1.5 to 2 liters of distilled water at a temperature of 50° to 95° C. After thorough agitation of the suspension for ten to thirty minutes, the precipitate was again filtered and washed. The leaching with excess hot distilled water and filtration was repeated four more times, the final leaching solution having a pH of 10 to 11. The filter cake was dried for 16 hours in an oven at 200° C. and the catalyst

| Prep. | Solution 1 | Solution 2 | Order of Addition | Yield of Allyl Alcohol | |
|---|---|---|---|---|---|
| | | | | Per Pass | Ultimate |
| (a) | 3.1* LiOH | 3* $H_3PO_4$ | 1 to 2 | 0 | |
| (b) | 4.2 LiOH | 3 $H_3PO_4$ | 2 to 1 | 6.7 | 73 |
| (c) | 5.2 LiOH | 3 $H_3PO_4$ | 2 to 1 | 14.6 | 49 |
| (d) | 4 LiOH | 3 $Na_3PO_4$ | 1 to 2 | 20.4 | 80 |
| (e) | 3 LiOH | 3 $H_3PO_4$ and 1 NaOH | 2 to 1 | 35.2 | 68 |
| (f) | 3.3 $LiNO_3$ | 3 $H_3PO_4$ | 2 to 1, then add 4 $NH_4OH$ | 7.1 | 24 |
| (g) | 3 $LiNO_3$ | 9 $Na_3PO_4$ | 1 to 2 | 2.0 | |
| (h) | 3 $LiNO_3$ | 4.5 $Na_3PO_4$ | 1 to 2, then add 2.5 NaOH | 11.7 | 29 |
| (i) | 3 $LiNO_3$ / 6 $HNO_3$ | 9 $Na_3PO_4$ / 1.5 NaOH | 1 to 2 | 2.2 | |
| (j) | 3 $LiNO_3$ | 4.5 $(NH_4)_3PO_4$ / 0.75 $NH_4OH$ | 1 to 2 | 0 | |
| (k) | 3 $LiNO_3$ | 4.5 $Na_3PO_4$ / 0.75 NaOH | 1 to 2 | 10.3 | 32 |

* Numbers indicate equivalents of reagent per mol of $Li_3PO_4$ formed.

The above lithium orthophosphate preparations in general involved reagent solutions at concentrations of 5 to 40% by weight, precipitation being effected at a temperature of 30° to 60° C. Variations in reagent concentration and temperature were without significant effect on the catalytic properties. In each case, the precipitate was filtered and washed on the filter with successive portions of hot water. The washed precipitate was dried for 16 hours at 200° C. and was then subdivided into pieces of about 4 to 12 mesh.

The following lithium orthophosphate catalysts prepared in accordance with this invention displayed both excellent activity and selectivity.

was prepared for use by subdividing into pieces of about 4 to 12 mesh.

Modifications in the concentration or reagents in the reacting solutions between about 5 and 50% by weight or of precipitation temperatures within the range of about 30° C. to 90° C. had no important effect on catalytic properties. However, it is essential for the production of highly active and selective catalysts that the precipitated lithium phosphate should be initially a basic phosphate, that is, a lithium orthophosphate containing excess alkali hydroxide such as sodium, potassium or lithium hydroxide. Preferably, this result is obtained by the provision of excess alkali hydroxide in the solution during the formation of the precipitate. Less desirably, such result is also attained by heating a precipitated lithium orthophosphate with a solution containing more than 0.2 mole, preferably 1 to 2 moles, of alkali hydroxide per mol. of precipitate for several hours at an elevated temperature, for example, at the boiling point for three hours or longer.

It is furthermore essential that substantially all the excess alkali hydroxide then be leached from the lithium basic phosphate. This is most readily accomplished, as described above, by suspending the precipitate in a large volume of hot distilled water and filtering, and repeating the leaching and filtration two to four times.

Both of the above essential features characterized the catalysts listed in Examples 1 to 11 in the above table.

The effect of inadequate leaching is shown in the following data on the catalytic properties of lithium phosphate prepared as set forth above with respect to Example 1, but subjected to the indicated number of leaching steps.

|  | Number of Leaching Steps | | | |
|---|---|---|---|---|
|  | 1 | 2 | 3 | 5 |
| Yield of Allyl Alcohol: | Percent | Percent | Percent | Percent |
| per pass | 5.7 | 38.8 | 61.5 | 66.9 |
| ultimate | 27 | 75 | 82 | 87 |
| Residual metal hydroxide content, expressed as weight percent Na | 4.2 | 1.4 | 0.45 | 0.21 |

Similar data are shown below with respect to catalysts prepared by mixing lithium nitrate solution with a solution containing potassium phosphate and hydroxide, and applying the indicated number of leaching treatments.

|  | Number of Leaching Steps | | |
|---|---|---|---|
|  | 1 | 3 | 5 |
| Yield of Allyl Alcohol: |  |  |  |
| per pass | 22 | 51.2 | 59.4 |
| ultimate | 45 | 87 | 83 |

In another comparative series, a catalyst (A) similar to that of Example 1, having been subjected to five successive leaching treatments, was tested for catalytic properties. A sample (B) of 150 grams, after five leaching treatments, was likewise tested after mixing with a solution of 2 grams of $Na_3PO_4 \cdot 12H_2O$ dissolved in 200 cc. of distilled water and evaporation of the water. A third example C, similar to the second but treated with ten times as much sodium orthophosphate, was also tested. Catalytic properties and analyses were as follows:

|  | Sample | | |
|---|---|---|---|
|  | A | B | C |
| Yield of Allyl Alcohol: | Percent | Percent | Percent |
| per pass | 68.7 | 65.1 | 11.5 |
| ultimate | 83 | 87 | 69 |
| Residual content of basic sodium compound, expressed as weight percent Na | 0.28 | 0.51 | 1.65 |

The significance of the leaching step was further substantiated in the following results obtained with the use of trilithium phosphate catalyst prepared in accordance with example 1 of U.S. 2,426,264, the precipitate being filtered on a Büchner funnel and very thoroughly washed in conventional manner by treatment on the filter with many successive portions of water.

| Reaction Temperature | Space Velocity | Conversion of oxide, percent | Yield of Allyl Alcohol, percent | |
|---|---|---|---|---|
|  |  |  | Per pass | Ultimate |
| 233° C | 0.64 | 37 | 28.4 | 77 |
| 286° C | 0.44 | 11 | 8.9 | 80 |

Catalysts of this invention may advantageously be admixed with other ingredients which are inert or have no adverse activity. For example, about one-tenth to an equal weight of finely-divided activated carbon or diatomaceous earth may be added to the final suspension of the basic lithium phosphate before filtration or it may be mixed with the moist precipitate before drying. Two such mixtures, containing 30% by weight of infusorial earth and of activated charcoal, respectively, were used as catalyst at 275° C. and space velocity of 0.5. They resulted in yields of 57.1 and 52.5% of allyl alcohol per pass, respectively, and 86% and 84% ultimate yields.

The foregoing experimental data have therefore confirmed the importance of the manner of preparation of the catalyst in order to secure the advantageous activity and selectivity in accordance with the process of this invention. Such advantages are made available by the provision of a leached basic lithium phosphate, initially prepared in the presence of 0.2 to 2 moles of alkali metal hydroxide or other basic alkali metal compound, from which all but 0.05 to 1% by weight of such excess residual alkali metal has been removed by leaching.

The improved process using the leached basic lithium phosphate catalyst in accordance with this invention provides excellent results at reaction temperatures within the range of about 250° to 350° C., preferably at about 275° C. to 300° C.

The rate of feed of liquid alkylene oxide may be varied from space velocities of about 0.3 to 2.0, preferably 0.5 to 1.0. Space velocity is defined herein as the volume of liquid feed per hour divided by the volume occupied by the catalyst. Residence time in the reaction zone within the above range amounts to about 2 to 50 seconds.

The activity of the catalyst will undergo a gradual decrease in activity with extended use. However, the selectivity of the present catalyst is not significantly impaired even after extended use, so that the ultimate yield of the desired alcohol remains high. Thus, while frequent regeneration is not essential, it is generally economical to restore the activity by suitable treatment when the conversion per pass had decreased to a value of 30 to 45%. Such a point may be reached after use of the catalyst for 24 to 48 hours or, expressed differently, after the catalyst has converted about 10 to 15 times its weight of oxide to alcohol.

Catalysts of this invention which have been somewhat inactivated by use may readily be restored to the initial high activity by extraction at elevated temperatures, preferably within the range of about 100 to 150° C. with a liquid oxygen-containing organic solvent such as acetone, propylene oxide, methyl alcohol, and dioxane. Catalysts may be recycled in this way forty or fifty times and still display the high original activity and selectivity, and in fact, may even be somewhat improved after such regeneration.

The novel catalysts of this invention are likewise used to advantage in the conversion of butylene and amylene oxide, particularly the 1-2 oxides, to the corresponding alcohol.

Modifications in the detailed examples specifically described above will be apparent to those skilled in the art and are included within the scope of the following claims.

What is claimed is:

1. In the isomerization of an alkylene oxide containing 3 to 5 carbon atoms to the corresponding alcohol, the process comprising passing said oxide in the gaseous state at a temperature of about 250° C. to 350° C. through a catalytic bed of leached basic lithium phosphate having a content of residual alkali metal hydroxide equivalent to 0.05 to about 1% by weight thereof of said alkali metal.

2. In the isomerization of propylene oxide to allyl alcohol, the process comprising passing gaseous propylene oxide at a temperature of about 250° C. ot 350° C. through a catalytic bed of leached basic lithium phosphate having a content of residual alkali metal hydroxide equivalent to 0.05 to about 1% by weight thereof of said alkali metal.

3. In the isomerization of propylene oxide to allyl alcohol, the process comprising passing gaseous propylene oxide at a temperature of about 250° C. to 350° C. through a catalytic bed of leached basic lithium phosphate having a content of residual sodium hydroxide equivalent to 0.05 to about 1% by weight thereof of said sodium.

4. The process of claim 2 wherein the space velocity is about 0.5 to 2 volumes of liquid oxide per hour per volume of catalyst.

5. The process of claim 2 wherein the temperature is maintained at about 275° C. to 300° C.

References Cited in the file of this patent

UNITED STATES PATENTS 2,426,264     Fowler et al. _____ Aug. 26, 1947